Patented July 17, 1928.

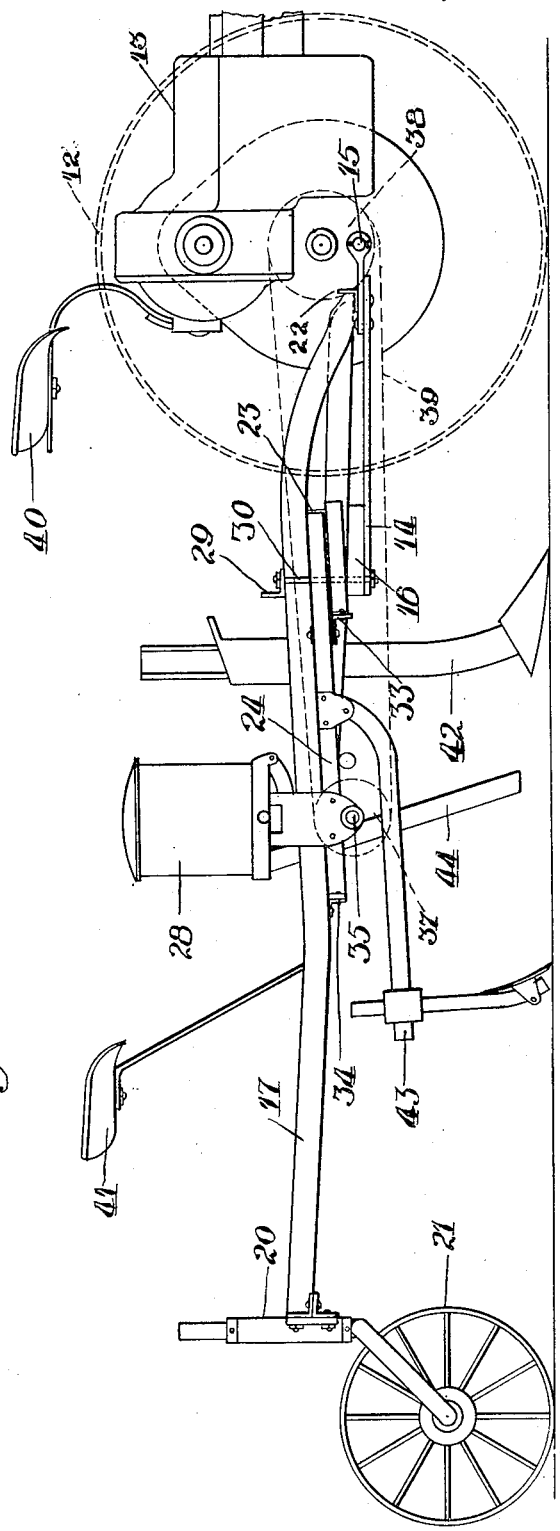

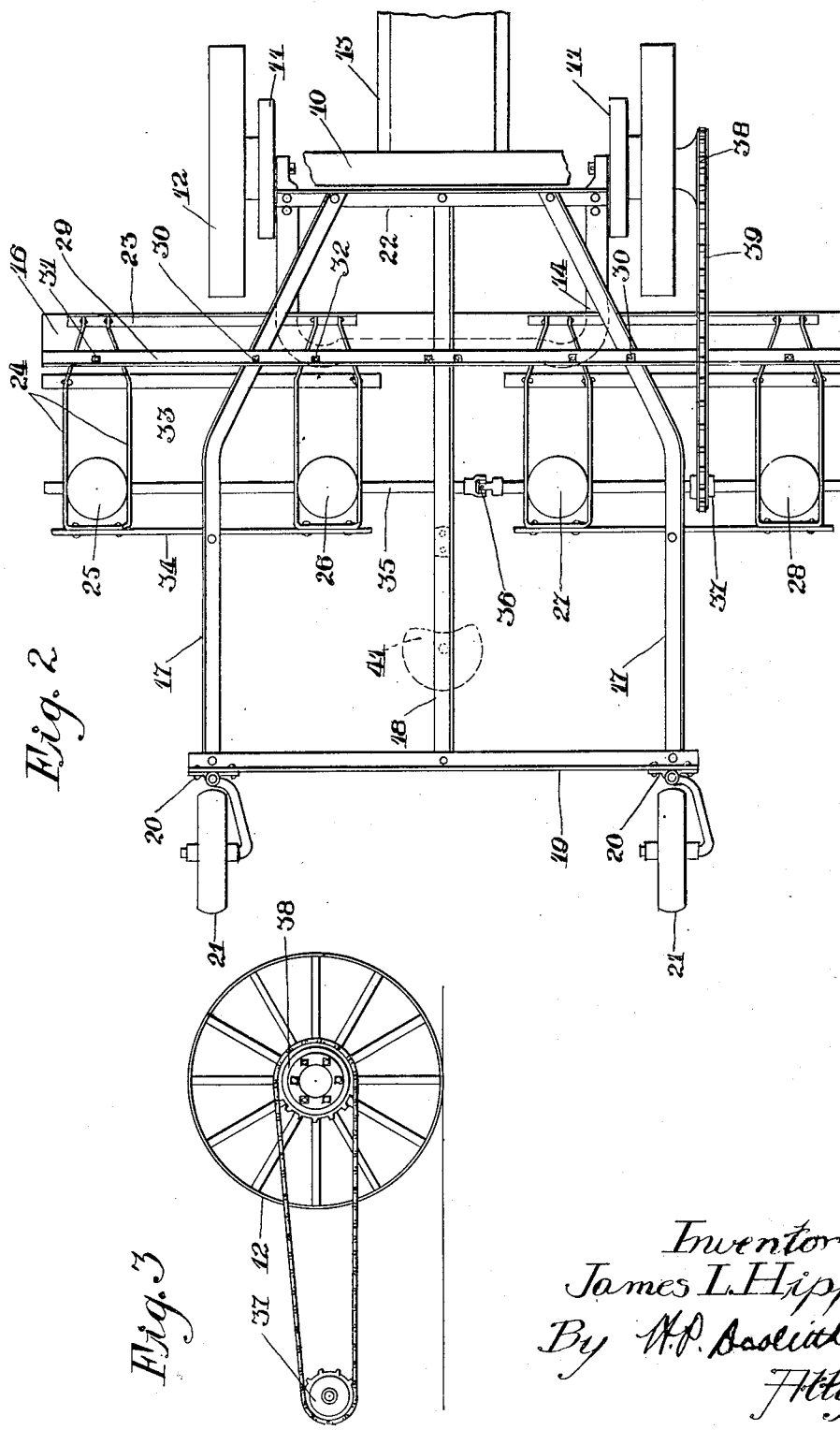

1,677,478

UNITED STATES PATENT OFFICE.

JAMES L. HIPPLE, OF CANTON, ILLINOIS, ASSIGNOR TO INTERNATIONAL HARVESTER COMPANY, A CORPORATION OF NEW JERSEY.

TRACTOR PLANTER.

Application filed October 11, 1926. Serial No. 140,713.

This invention relates to farm implements designed for attachment to the rear of a tractor and more particularly to a multiple unit planting attachment of the character stated. The main object of the invention is to provide an attachment that can be connected to a tractor in a manner to bring the planting units closely behind the rear traction wheels where they will be under the observation of the driver and to so connect the tractor and attachment that both will move as a unit when turning, thereby permitting a turn to be made in a comparatively restricted space. A further object is to provide a construction for such an attachment that will permit the use of four or more planter units, certain of which will be positioned laterally outside of the traction wheels and to support the attachment on transport means that will permit it to follow the movements of the tractor.

The above and other minor objects have been obtained by providing a rigid frame structure having a forwardly extending portion designed to be received between the traction wheels of a tractor and connected to a horizontally extending arched draw bar pivoted on the axle structure of the tractor for movement vertically; a laterally extending portion designed to be positioned immediately to the rear of the traction wheels and a rearwardly extending portion supported on suitable swivelling transport wheels located on the tread line of the traction wheels; this frame when connected to the tractor being substantially rigid therewith except for relative vertical movement at the point of connection of the arched draw bar.

The invention accordingly resides in the organization and details of construction hereinafter more specifically described and then defined in the claims.

Referring to the drawings,—

Figure 1 is a side view of the attachment in combination with a rear portion of the tractor;

Figure 2 is a plan view with certain nonessential parts shown in Figure 1 omitted; and Figure 3 is a detailed side elevation of the driving connection between the tractor and attachment.

In the present instance the invention has been illustrated in combination with a tractor comprising a rear axle structure having a transverse housing 10, and depending end housings 11 on the outer sides of which traction wheels 12 are mounted. The forwardly extending body of the tractor is shown in part at 13. The tractor normally carries a horizontally extending arched draw bar 14, the arms of which are hinged or pivoted to trunnions 15 on the inner sides of the housings 11 as seen in Figure 1.

In the practice of the present invention the arched draw bar 14 has fixedly secured to it a transverse beam or frame member 16 which extends laterally beyond the traction wheels at each side of the tractor and forms the main transverse element of a rigid frame structure comprising also longitudinally extending bars 17 and 18, connected at their rear ends by a bar 19 to the outer ends of which are connected bearing brackets 20, having the vertical standards of castor wheels 21 journaled therein. The upward ends of the outer longitudinally extending bars 17 preferably converge as seen in Figure 2, and extend forwardly over the bar 16 to a cross bar 22 connecting the forward ends of the arms of the arched bar 14 to which the forward ends of bars 17 as well as the forward end of bar 18 are secured.

Each bar 17 overlies an angle bar 23 secured on the upper side of beam 16 at its forward edge, which angle bar serves as the point of attachment for the drag bars 24 of planter units 25, 26, 27, 28, a pair of which is located on each side of the frame of the attachment. A second transverse member or bar 29 is positioned above the main bar or beam 16 in parallel relation thereto and rests on the longitudinal bars 17 and 18. The several bars forming the longitudinal and transverse members of the frame are clamped together and to the bight portion of the arched bar 14 by means of main clamp bolts 30, one of which extends thru each converging portion of the bars 17 and thru the beam 16 and bar 14 as shown in Figure 2. Other clamp bolts as at 31 and 32 are preferably provided for the purpose of rigdly securing the frame parts heretofore described.

The planter units are connected in spaced relation at points throughout the length of the main transverse beam 16 by means of the drag bars 14 as heretofore described and are so arranged that each lateral pair of planter units straddles the tread of a traction wheel.

Spreader bars 33 and 34 are used to properly maintain the planter units in spaced relation and to support them on the longitudinal bars 17. The planter units are of conventional type using seed dispensing mechanism which need not be described and the seed dispensing mechanisms in the several units are in this instance actuated by common drive shaft 35 preferably formed in sections connected by universal joint 36 in order to accommodate the shaft to bending movement between the two lateral halves of the frame.

The shaft 35, carries a drive sprocket 37 and one of the traction wheels 12 has a corresponding drive sprocket 38, secured thereto in alignment with the sprocket 37 so that a sprocket chain 39 may be trained thereover and serve as driving means for the seed dispensing mechanism of the planter units.

With the construction of auxiliary or attachment frame described, it will be evident that such a frame comprises a forwardly extending portion formed by the front ends of arms 17 and 18 and the transverse bar 22, which can be received between the traction wheels of a tractor and pivotally secured to its axle structure thru the medium of the arched bar 14, the bight of which serves for connection of the transverse portion of the auxiliary frame comprising the beam 16, bar 29 and the parts of the planter units. It will also be evident that the attachment when so connected will be restricted to movement vertically with respect to the tractor and will swing laterally with it when the front end of the tractor is steered on a short turn, the castor wheel type of support for the rear end of the auxiliary frame permitting it to readily follow such movements of the tractor.

The planter units are by this construction closely coupled to the rear of the tractor thereby permitting short turns at the head lands and where their operation is under observation of the driver on the seat 40, or of a second operator on the seat 41 which may be provided on the frame of the attachment. For purposes of illustration the usual furrow openers 42, and covers 43, have been shown in Figure 2 in combination with the seed spout 44 of a planter unit to show the preferred arrangement of these elements on the planting attachment.

While the above construction exemplifies the preferred form of the invention, it is evident that certain modifications in the structure described are possible without departing from the scope of the invention as defined in the following claims.

What is claimed as new is:

1. The combination comprising a vehicle having rear traction wheels, a horizontally extending arched bar between the wheels the arms of which are pivoted to the vehicle for free vertical movement, a transverse frame member secured to the bight of the arched bar and extending laterally beyond the traction wheels, rearwardly extending frame members secured to the transverse bar and supported at their rear ends on castor wheels, said castor wheels being on the tread line of the traction wheels and tillage implements secured in spaced relation throughout the length of the transverse frame member and symmetrically disposed at each side of the tread line of said wheels.

2. The combination comprising a vehicle having rear traction wheels, a horizontally extending arched bar between the wheels, the arms of which are pivoted to the vehicle for free vertical movement, a transverse frame member secured to the bight of the arched bar and extending laterally beyond the traction wheels, rearwardly extending frame members, secured to the transverse bars and supported at their rear ends on castor wheels, said castor wheels being on the tread line of the traction wheels, planter units secured in spaced relation throughout the length of the transverse frame member and symmetrically disposed at each side of the tread line of said wheels, an actuating shaft common to all the planter units, and means for actuating said shaft from a traction wheel.

3. The combination with a vehicle having rear traction wheels, of a frame supported at its rear on castor wheels located in tread alignment with the traction wheels and having a forward extension located between said traction wheels and pivoted to the vehicle on a horizontal axis, and a series of four transversely aligned equally spaced planter units carried by the frame, two of which are located outside the paths of the traction wheels and two of which are within said lines.

4. The combination with the rear axle structure and wheels of a tractor, of a planter attachment having a rigid frame comprising a forward portion located between the traction wheels and connected to the axle structure for relative movement between the frame and axle structure in a vertical direction only, a transverse portion immediately behind the traction wheels and extending laterally beyond them and a rear portion supported on castor wheels in tread alignment with the traction wheels, planter units carried by the transverse portion of the frame with the outer units disposed beyond the tread line of said wheels, and actuating means for the units driven from the traction wheels.

In testimony whereof I affix my signature.

JAMES L. HIPPLE.